UNITED STATES PATENT OFFICE.

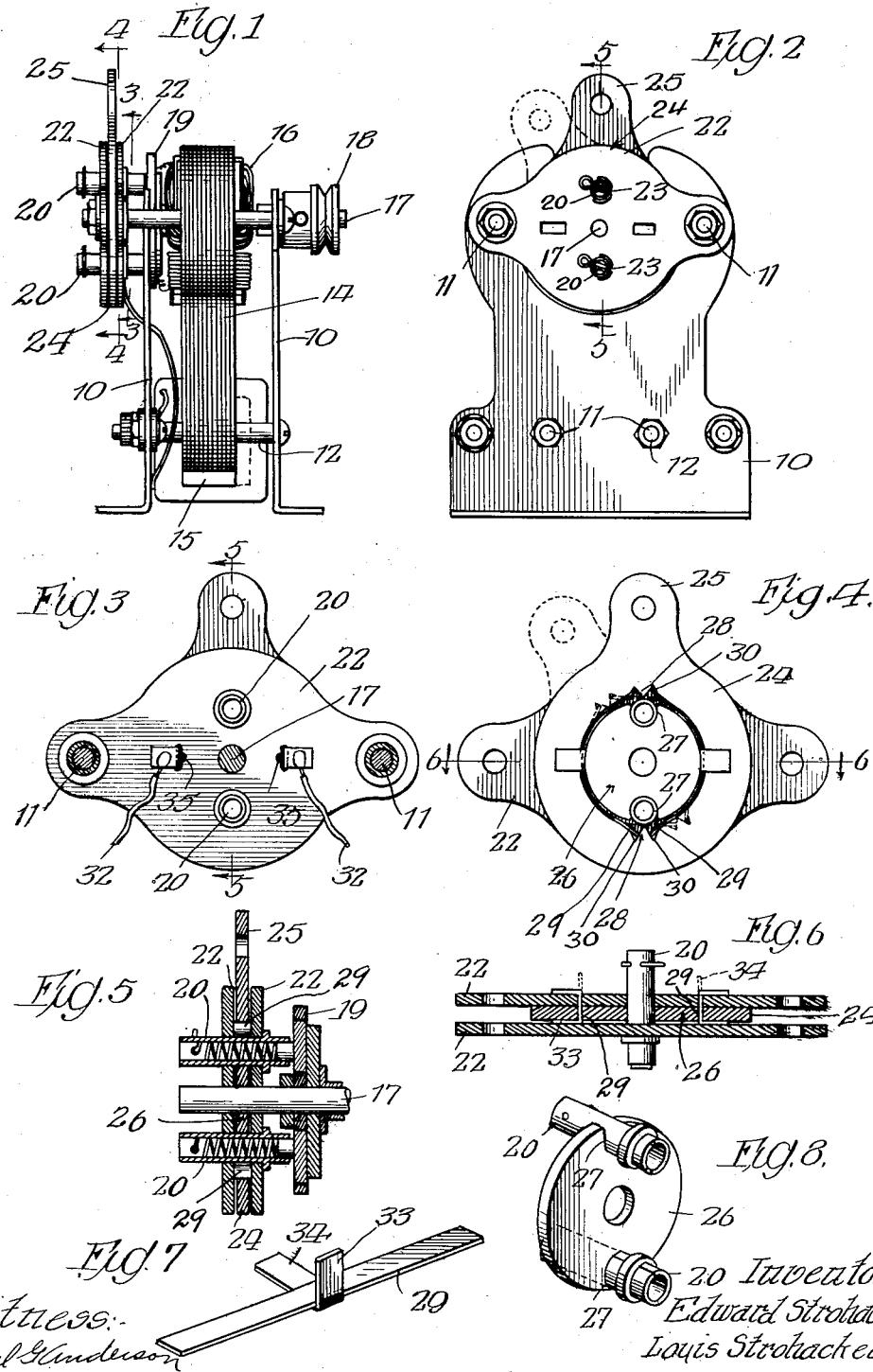

EDWARD STROHACKER AND LOUIS STROHACKER, OF FREEPORT, ILLINOIS, ASSIGNORS TO STRUCTO MANUFACTURING COMPANY, OF FREEPORT, ILLINOIS, A CORPORATION OF ILLINOIS.

SWITCH AND BRUSH MOUNTING FOR ELECTRIC MOTORS.

1,293,973.  Specification of Letters Patent.  Patented Feb. 11, 1919.

Application filed May 18, 1917. Serial No. 169,394.

*To all whom it may concern:*

Be it known that we, EDWARD STROHACKER and LOUIS STROHACKER, citizens of the United States, and residents of Freeport, in the county of Stephenson and State of Illinois, have invented certain new and useful Improvements in Switch and Brush Mountings for Electric Motors; and we do hereby declare that the following is a full, clear, and exact description thereof, reference being had to the accompanying drawings, and to the characters of reference marked thereon, which form a part of this specification.

This invention relates to a novel pole-changing and reversing switch for electric motors and also to a brush support, and the invention consists in the combination and arrangement of the parts shown in the drawings and hereinafter described, and is pointed out in the appended claims.

The improved switch is herein shown as applied to motors having a small horsepower output, as for instance, a motor designed to operate mechanical toys, talking machine mechanisms, sewing machines, and the like, but may be applied to larger uses.

Among the objects of the invention are to simplify the construction of the switch and also simplify its assembly in the motor.

A further object of the invention is to combine the switch mounting with the mounting for the brushes of the motor in a way to greatly simplify the motor construction generally.

Another object of the invention is to simplify the switch mounting by arranging the parts so that the swinging switch element may be pivoted to swing about the axis of the armature shaft.

Another object of the invention is to produce a switch mechanism in which the elements thereof, aside from the current conducting elements, may be made principally or entirely of insulating material, thereby simplifying the switch and greatly decreasing the cost of its construction.

A further object of the invention is to provide a novel arrangement of the movable switch terminals in the switch member so arranged as to permit them to be readily assembled in the switch member and to efficiently make and break the circuit.

Other objects of the invention are to improve and simplify switches for this general purpose.

As shown in the drawings:—

Figure 1 is an edge elevation of an electric motor equipped with a switch embodying said invention.

Fig. 2 is a side elevation thereof.

Fig. 3 is a section on the line 3—3 of Fig. 1.

Fig. 4 is a section on the line 4—4 of Fig. 1.

Fig. 5 is a section on the line 5—5 of Fig. 3.

Fig. 6 is a section on the line 6—6 of Fig. 4.

Fig. 7 is a view of one of the switch terminals before being assembled and its clip.

Fig. 8 is a perspective view of the brush supporting disk.

The frame of the motor herein shown embraces two side members 10 which are rigidly connected together through the medium of tie bolts 11 inserted through spacing tubes 12 and nuts threaded on the ends of said bolts. 14 designates the field magnet which is of general horseshoe shape, with its winding 15 mounted on the central closed portion thereof. 16 designates the armature, herein shown as a three-pole armature, which is fixed to and rotates with a shaft 17 that is mounted in suitable bearings in the frame and provided with a drive pulley 18. 19 designates, as a whole, the commutator which is mounted on said armature shaft to rotate therewith. The commutator herein shown is of the disk type, having its segments exposed on one side face thereof for contact with the brushes 20, said commutator being of the type such as is shown in the co-pending application, Serial No. 169,395, filed of even date herewith by Edward Strohacker.

Referring now to the construction of the switch constituting the present invention, the same is made as follows:

22, 22 designate flat plates of the shape best shown in Figs. 2, 3 and 4. They are supported on the motor frame by extensions of the upper tie rods 11 at the commutator side of the motor, the plates being provided with central openings for the passage of the armature shaft therethrough. Said plates support the brushes 20 of the motor which extend inwardly beyond the plates for contact with the segment face of the commutator.

Mounted between said plates 22 is a swinging or rotating switch member 24 having a hand piece 25 by which it is actuated. Said switch member is rotative about the axis of the armature shaft. As herein shown, said switch member does not have bearing directly on the armature shaft, but rotates about a disk 26 which is provided with a central aperture 26' to receive, and is supported directly on, the armature shaft 17. The disk is provided at its periphery with two diametrically opposed notches 27, 27 (Fig. 4) to receive said brushes 20, which latter are cylindric; and said brushes are exposed slightly beyond the periphery of the disk for contact with the movable terminals of the switch, as hereinafter described. The opening in the switch member to receive said disk 26 is of slightly greater diameter than said disk and is elongated at diametrically opposed points, where the edge of said opening is provided with inwardly directed spurs or teeth 28 (Fig. 4).

Arranged in the space between said disk and the inner edge of the opening in the switch member are two oppositely located terminal strips 29. Said terminal strips are made of some good current conducting material. They are thin and possess good resilient qualities, spring steel being a suitable material. The terminal strips are each made of a length equal to about one half of the circumference of the disk 26, and are of such length that when inserted into the space between the switch member and disk 26 the ends of the terminal strips enter the notches 30 formed at the opposite sides of the teeth or spurs 28 and are thereby interlocked to the switch member 24. Said spurs or teeth 28, therefore, constitute means to separate and insulate the ends of said terminal strips. The arrangement described also has the effect to throw the ends of the terminal strips outwardly away from the disk, as best shown in Fig. 4, so that when the switch member is rotated to bring said separating and insulating teeth into a plane passed through the axes of the brushes said brushes are out of contact with both terminal strips. This is the neutral position of the switch and is indicated in full lines in Fig. 4. When the switch is turned either to the right or to the left from the neutral position, as indicated by the dotted outline in Fig. 4, the switch terminals which, by reason of their interlocking engagement with the switch member, turn or rotate with said switch member and are brought, one into contact with one of the brushes 20 and the other into contact with the other brush 20, thereby closing the circuit through said brushes to drive the motor in one direction. A reversal of movement of the switch serves to reverse the motor.

The switch terminals are connected to the conductors 32 of the motor circuit by means of clips 33, originally made of L-shape, as indicated by dotted outline in Fig. 6 and full lines in Fig. 7, which are inserted into the space between the disk 26 and switch member and engaged over the edges of the terminal strips and the extended ends 34 thereof are passed through slots 35 in the innermost frame member 22 and folded thereover as indicated in Fig. 6. The conductors 32 may be soldered or otherwise connected to said clips. The construction described provides a sliding knife switch edge between the terminals and said clips which is very positive in operation. The clips also aid to hold the terminal strips in place.

The various non-metallic parts of the switch may be made wholly of an insulating material, such, for instance, as fiber, and the construction is such as to permit said elements to be stamped or cut out of sheet fiber by very simple cutting and punching operations. Said non-metallic parts, when made wholly of insulating material avoid the necessity of employing special insulating medium which is required to be applied to or assembled in the switch structure, thereby greatly simplifying the operation of assembling the switch and reducing the time and labor required in its assembly.

While it is very convenient in the motor assembly shown to mount the switch member to rotate about the axis of the armature shaft, and while the arrangement shown is such that the switch structure is designed to carry the brushes, it will be understood that, for use in different locations, the switch may be otherwise mounted and that, in such event, the fixed terminals of the switch, constituted in the present instance by the brushes, may be solid rods or the like. The various advantageous features of assembly are hereinafter made the subject of specific claims.

A further advantage of the commutator construction, in addition to those hereinabove referred to, lies in its extremely narrow width, thereby rendering the motor construction very compact. The commutator structure is also peculiarly adaptable to the type of switch and brush-mounting shown and in connection with which it is adapted to be used, both features combined adding greatly to the compactness of the motor at the commutator side thereof.

We claim as our invention,—

1. An electric switch comprising a flat member rotatable about an axis perpendicular to its plane, fixed terminals on opposite sides of said axis, curved terminal strips fixed to and movable with said member and adapted to contact with said fixed terminals to close a circuit, said strips being separated and insulated from each other at their ends by means which hold said ends out of contact with the fixed terminals in the neutral position of the switch.

2. An electric switch comprising a flat switch member having an opening, a fixed disk mounted in said opening about which said switch member rotates, fixed terminals seated in said disk, curved terminal strips between the edge of said disk and said switch member and partially surrounding said member and rotating with the disk for contact with said fixed terminals to close a circuit, said terminals being separated and insulated from each other at their ends and turned outwardly at said ends away from the periphery of the disk.

3. An electric switch comprising a flat switch member having an opening, a fixed disk mounted in said opening about which said switch member rotates, fixed terminals seated in said disk, curved terminal strips between the edge of said disk and said switch member and rotating with the latter and adapted for contact with the fixed terminals to close a circuit, the opening on said switch member being provided with diametrically opposed, spaced notches to receive and retain the outwardly turned ends of said strips.

4. An electric switch comprising a flat open switch member having a fixed disk mounted in said opening about which said switch member rotates, fixed terminals seated in said disk, curved terminal strips between the edge of said disk and said switch member and rotating with the latter and adapted for contact with the fixed terminals to close a circuit, with means to insulate said terminal strips from each other at their ends and to space said ends from the fixed terminals, and terminal clips having knife-edge contact with said strips.

5. An electric switch comprising a swinging switch member provided with an opening concentric to its swinging axis, fixed contacts located on diametrically opposite sides of the said axis, said opening being diametrically elongated and provided at its elongated portions with inwardly directed projections which separate notches in the edge of said opening, and curved terminal strips seated against the inner edge of said opening with their ends extending into said notches and adapted for wiping contact with said fixed terminals.

6. An electric switch comprising a fixed central disk having diametrically opposed peripheral notches, fixed terminals seated in said notches, an open switch member surrounding and rotative about said disk, curved terminal strips partially surrounding said disk between the latter and the edge of the opening of the switch member, the switch member provided at diametrically opposite points with notches located radially exterior to a circle describing the curved edge of said opening into which the ends of said strips are seated whereby said terminal strip ends are spaced from each other and out of contact with the stationary terminals when the switch is in its neutral position.

7. An electric switch structure comprising parallel frame plates of insulating material, a flat swinging switch member of insulating material mounted between said plates and having a central opening, diametrically opposed fixed terminals mounted in said plates and extending through said opening, and curved terminal strips seated against the edge of said opening and spaced and insulated from each other at their ends at diametrically opposed points of said opening; and adapted for wiping contact with said fixed terminals.

8. An electric switch structure comprising parallel frame plates of insulating material, a flat swinging switch member of insulating material mounted between said plates and having a central opening, diametrically opposed fixed terminals mounted in said plates and extending through said opening, curved terminal strips seated against the edge of said opening and spaced and insulated from each other at their ends at diametrically opposed points of said opening, and adapted for wiping contact with said fixed terminals, and terminal clips having knife-edge contact with said strips and extending through the opening in said members and through openings in one of said plates and fixed to the latter.

9. A switch for electric motors comprising, in combination with the armature shaft, a switch member mounted to swing about the axis of said shaft, fixed switch terminals at opposite sides of said shaft, switch terminal strips carried by the switch member and curved concentrically to the axis of said shaft and adapted for wiping contact with said fixed terminals, and means whereby the ends of said terminal strips are spaced and insulated from each other and are spaced from said fixed terminals when the switch is in neutral position.

10. A switch for electric motors comprising, in combination with the motor frame, an armature shaft rotatively mounted therein and a commutator mounted on said shaft, of plates secured to the motor frame at the commutator side of the motor, a flat switch member between said plates mounted to swing about the axis of said armature shaft, fixed terminals mounted in said plates and extending through an opening in the switch member and movable terminal members carried by the switch member for contact with the fixed terminals.

11. A switch for electric motors comprising, in combination with the motor frame, an armature shaft rotatively mounted therein and a commutator mounted on said shaft, of plates secured to the motor frame at the commutator side of the motor, a flat open switch member between said plates mounted to swing about the axis of said armature shaft, opposed fixed terminals mounted in said plates and extending through said open switch member and movable terminal members curved concentrically to the axis of said shaft and insulated from each other and carried by the switch member for wiping contact with the fixed terminals.

12. A switch for electric motors comprising, in combination with the motor frame, an armature shaft rotatively mounted therein and a commutator mounted on said shaft, of plates secured to the motor frame at the commutator side of the motor, a flat open switch member between said plates mounted to swing about the axis of said armature shaft, a fixed disk mounted in the opening of said switch member and provided with opposing peripheral notches, fixed terminals extending through said openings in said plates and seated in said notches, and curved resilient terminal strips for wiping contact with the fixed terminals located between the edge of said disk and the edge of the opening on the switch member and insulated from each other at their ends and movable with said switch member, said ends of the terminal strips being turned outwardly away from the periphery of said fixed disk.

13. The combination with an electric motor, including its armature shaft and its side contact commutator, of a manually operable reversing switch and combined brush mounting surrounding said shaft adjacent to the commutator, the switch being pivoted to swing about the axis of said armature shaft, and brushes adapted for contact with the commutator, said brushes being parallel to said shaft and being disposed radially within the terminals of said switch.

14. The combination with an electric motor, including its armature shaft and its commutator, of a reversing switch comprising a swinging-switch member and its terminals, and stationary brushes for contact with the commutator and constituting fixed terminals of the switch with which the switch member terminals have wiping contact.

15. A reversing switch and brush mounting for electric motors comprising, in combination with an electric motor, including its armature shaft and its commutator, an open switch member mounted to rotate about the axis of the armature shaft, fixed brushes extending through said switch member for engagement with the commutator, and terminal strips carried by the switch member for contact with said brushes, the ends of the strips being arranged to be out of contact with said brushes in the neutral position of the switch.

16. A reversing switch and brush mounting for electric motors comprising, in combination with an electric motor, including its armature shaft and a side contact commutator mounted on said shaft, a switch member rotative about the axis of said shaft, fixed brushes engaging said commutator and extending through an opening in said switch member and terminals carried by the switch member for contact with said brushes.

17. A reversing switch and brush mounting for electric motors comprising, in combination with an electric motor, including its armature shaft, a side contact commutator mounted on said shaft and parallel plates mounted on the motor frame at the commutator side thereof, a flat switch member mounted between said plates to rotate about the axis of the armature shaft, brushes mounted in and extending through said plates and extending through an opening in said switch member and contacting with the side face of the commutator, and constituting also fixed terminals of the switch, and movable terminals carried by the switch member and insulated from each other and adapted for wiping contact with said brushes.

18. In an electric switch, an open, swinging switch member, and resilient switch terminal strips seated against the edge of said opening and interlocked at their ends in diametrically opposed recesses in said edge.

19. In an electric switch, an open, swinging switch member, and resilient switch terminal strips seated against the edge of said opening and interlocked at their ends in diametrically opposed recesses in said edge, and terminal clips engaging over the edges of said strips and having sliding, knife-edge contact therewith.

20. A brush mounting for motors comprising a disk provided with a central opening to receive the armature shaft of the motor and provided with opposed peripheral notches, and brushes seated in said notches and exposed for contact radially beyond the periphery of the disk and extending at their ends beyond the side faces of the disk.

In testimony whereof we claim the foregoing as our invention, we hereunto append our signatures in the presence of two witnesses, at Freeport, Illinois, this 14th day of May, 1917.

EDWARD STROHACKER.
LOUIS STROHACKER.

Witnesses:
C. E. THOMPSON,
A. G. TREMBLY.